United States Patent [19]

Piatt

[11] Patent Number: 4,654,501
[45] Date of Patent: Mar. 31, 1987

[54] METHOD FOR METAL BONDING OF BEARINGS

[76] Inventor: Ray Piatt, 2520 Camino Entrada, P.O. Box 5075, Santa Fe, N. Mex. 87502

[21] Appl. No.: 770,269

[22] Filed: Aug. 28, 1985

Related U.S. Application Data

[63] Continuation-in-part of Ser. No. 462,792, Feb. 1, 1983, abandoned.

[51] Int. Cl.$^4$ ................................................ B23K 9/04
[52] U.S. Cl. .............................. 219/76.14; 219/76.15; 219/125.12; 29/149.5 R
[58] Field of Search ................. 219/76.1, 76.11, 76.14, 219/76.15, 125.12; 29/149.5 R

[56] References Cited

U.S. PATENT DOCUMENTS

| | | | |
|---|---|---|---|
| 3,128,365 | 4/1964 | Schilberg | 219/76.15 |
| 3,428,774 | 2/1969 | Faust et al. | 219/76.11 X |

FOREIGN PATENT DOCUMENTS

| | | | |
|---|---|---|---|
| 712314 | 6/1965 | Canada | 29/149.5 R |
| 24749 | 2/1980 | Japan | 219/76.15 |
| 704539 | 2/1954 | United Kingdom | 29/149.5 R |

OTHER PUBLICATIONS

Cary, Howard B. *Modern Welding Technology*, 1979, Prentice-Hall, pp. 95–98.

*Primary Examiner*—E. A. Goldberg
*Assistant Examiner*—Catherine Sigda
*Attorney, Agent, or Firm*—Eugene M. Bond

[57] ABSTRACT

A method is presented for metal bonding of a base metal by creation of a weld puddle by means of an air cooled gas-tungsten-arc torch.

As the puddle is created, the filler metal is fed as a wire into the puddle by means of a cold wire feed mechanism. The torch is automatically moved across the base metal in a longitudinal direction. The filler metal is deposited as the torch transverses the base metal. At the end of each stroke, the base metal is automatically indexed radially to the width of the weld bead. The process is continued until the bearing journal has been completely covered with filler metal to the required thickness.

In a disclosed preferred method, the filler metal is a tin, antimony, copper babbitt alloy which is bonded to a bronze metal for bearings.

4 Claims, 4 Drawing Figures

METHOD FOR METAL BONDING OF BEARINGS

This application is a continuation-in-part of application Ser. No. 06/462,792, filed Feb. 1, 1983, now abandoned.

FIELD OF THE INVENTION

The present invention provides a method for metal bonding a filler metal onto a base metal by passing an air cooled gas-tungsten-arc torch in contact with the base metal in a relative longitudinal direction, creating a weld puddle by means of the said air cooled gas-tungsten-arc torch, feeding a solid length of filler metal into the air cooled gas-tungsten-arc torch from a relative transverse direction thereto, indexing the longitudinal direction of travel of the air cooled gas-tungsten-arc torch to the width of a weld bead, and continuing the sequence until the base metal is bonded with filler metal.

BACKGROUND OF THE INVENTION

Numerous methods have been proposed for metal bonding of bearings. For example, U.S. Pat. No. 3,500,526, describes a method of applying bearing metal to the interior of a bearing shell. The steps of the process comprise tinning the bearing side and applying heat directly to the surface portion of the bearing side to aid in the adhesion of the tin to the bearing metal. A first pass of molten bearing metal is poured onto the heated shell portion. The adjacent shell surface is immediately cooled on the opposite side to solidify the metal deposited and to ensure the adhesion to the shell. The steps of applying heat, pouring and cooling are continued until the metal is deposited to the desired depth.

U.S. Pat. No. 2,588,421, describes a process for coating metal with a spray gun. You will note in column 1 in the paragraph beginning at line 39, that the inventor describes the use of this metal in forming or rebuilding the bearings. In column 4 in the paragraph beginning at line 53, the inventor states that the metal spraying is carried out using a metal spray gun and wire or rod as a source of metal.

U.S. Pat. No. 3,057,046, relates to a method for the manufacture of metal bearings and bearing surfaces. As it is pointed out in column 1 in the paragraph beginning at line 49, one of the steps of the process consists of applying a metal to the surface of a bearing by spraying.

Typically, in prior art methods, base metal dilution results thereby providing a weak weld between the bonding metal and the base metal. Often when babbitt metal is heated to the molten state, there is a tendency for the antimony component of babbitt to separate which compromises the integrity of the alloy.

Prior art methods also invite contamination during bonding which creates porosity in the finished bearing surface.

Prior art methods also suffer a defect in effective control of the deposit thickness with resultant waste of expensive bearing material.

In those prior art methods which require pre-heating suffer a further disadvantage in that the base metal frequently experiences distortion.

Practice of the present invention overcomes these and other disadvantages experienced in the prior art.

It is an object of the present invention to provide a bond having truer weld with minimal base metal dilution.

Another object of practice of the present invention is to provide a method wherein antimony separation of the babbitt alloy does not occur thereby maintaining the integrity of the babbitt alloy.

A further object of the present invention is to provide a shielding of the weld puddle by means of an inert gas during deposit of the babbitt alloy, thereby avoiding contamination of the molten alloy and resultant porosity in the finished bearing surface.

Yet another object of the present invention is to provide a method wherein control of deposit thickness of the bonding alloy is effected which can be closely controlled with the resultant elimination of excess waste of expensive bonding alloy.

Another further object of the present invention is to eliminate a pre-heating step of the base metal thereby minimizing base metal distortion.

These and other objects and advantages will become more apparent from the following more detailed description of the present invention.

SUMMARY OF THE INVENTION

Generally stated, the present invention provides a method for metal bonding a filler metal onto a base metal by passing an air cooled gas-tungsten-arc torch in contact with the base metal in a relative longitudinal direction such that a weld puddle is created by means of the air cooled gas-tungsten-arc torch. When the weld puddle is created, a solid length of filler metal is fed into the air cooled gas-tungsten-arc torch from a relative transverse direction. As the bead is formed, the unit is indexed in the longitudinal direction of travel of the air cooled gas-tungsten-arc torhc to the width of a weld bead, and the method is continued by sequence until the base metal is bonded with filler metal.

THE DRAWINGS

In the drawings where similar numerals illustrate similar elements throughout the several views.

DETAILED DESCRIPTION OF THE PRESENT INVENTION

In practice of the present invention, a base metal to be bonded, such as a bronze bearing, is secured against movement.

Next, a suitable air cooled gas-tungsten-arc torch is positioned for flame contact with the base metal. The heat created by the air cooled gas-tungsten-arc torch causes a puddle to be created in the base metal. The air cooled gas-tungsten-arc torch is then caused by suitable means to travel in a relatively longitudinal direction along the base metal.

Using a cold wire feed mechanism, filler metal introduced as a solid length, possibly including a hollow core, into the puddle created by the air cooled gas-tungsten arc torch, the length of filler metal being introduced continuously from a transverse relative direction to the movement of the air cooled gas-tungsten-arc torch, and preferably at an angle of about 10 degrees from either the horizontal or longitudinal planes.

Passage of the air cooled gas-tungsten-arc torch causes a shielding of the weld puddle by the cooling gas during deposit of the filler metal such that there is substantially no contamination. Correspondingly, absence of contamination insures against porosity in the finished bearing surface.

The bearing material may be any of a variety of antifrictional metal linings commonly used for bearing purposes as babbitt metal and other bearing alloys containing lead, tin, copper, zinc, antimony, etc. In the present example, a commonly used bearing metal containing 85% copper, 6.5% tin, 6% lead, and 3% zinc (SAE No. 660) is employed. An example of the bronze base metal for bearings is 85-5-5 ratio of copper, antimony and tin. Practice of the present invention may be usefully applied to cooper-alloy metals consistent with the foregoing.

Passage of the air cooled gas-tungsten-arc torch may be effected by means of an automatic feed in the relatively longitudinal direction. When the torch transverses the base metal, the base metal may be indexed radially at the end of each stroke to a width of the weld bead being applied. This process is repeated until the bearing journal has been covered completely with filler metal to the required thickness, thereby providing a substantially semi-automatic method. A useful commercially available torch is Airco Model H10-A.

Figure 1:
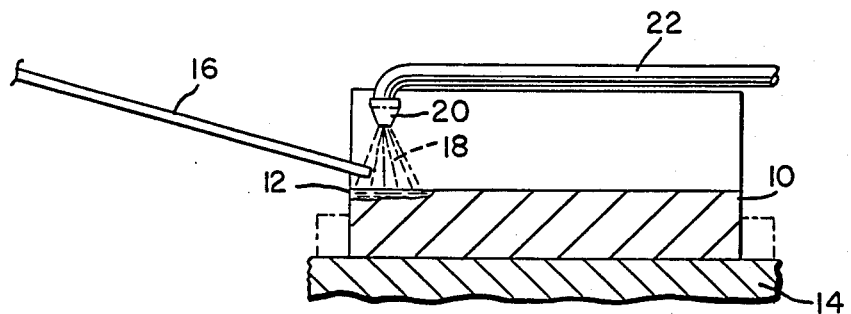
FIG. 1 is a vertical sectional view illustrating the present method at the beginning of a typical puddle stroke.
Figure 2:
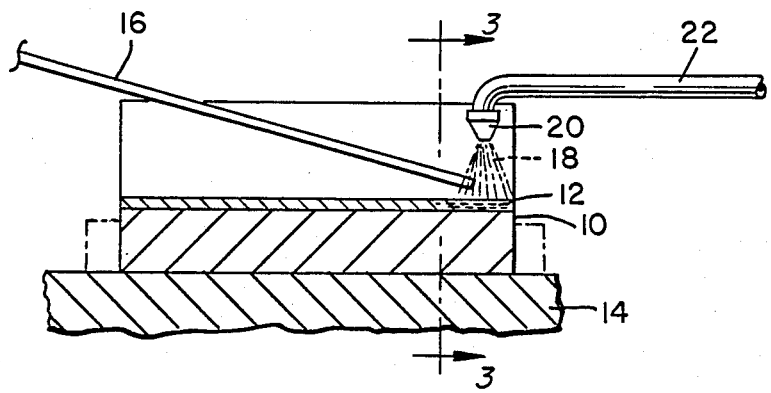
FIG. 2 is a vertical sectional view similar to that of FIG. 1, illustrating the present method at the end of a typical puddle stroke.

In FIG. 1, base metal 10 is shown receiving molten weld metal 12 while supported on mount 14. Filler rod 16 is supplied from a suitable feed source, not shown, to arc 18 from welding torch 20 which is joined to a suitable welding source, not shown, through arm 22. In FIG. 1, the present method is depicted at the beginning of a puddle stroke, with FIG. 2 illustrating the method at the end of a typical puddle stroke. Passage of the air cooled gas-tungsten-arc torch 20 may be effected by means of an automatic feed in the relatively longitudinal direction.

Figure 3:
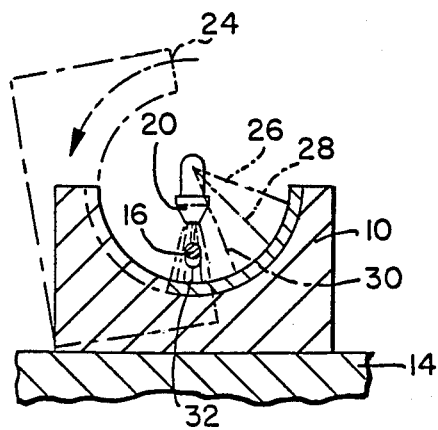
FIG. 3 is a transverse sectional view taken along sectional lines 3—3 of FIG. 2, illustrating the method of the present invention of the middle part of the operation.

In FIG. 3, taken as a transverse cross-sectional view along line 3—3 of FIG. 2 at the middle point of the operation, phantom illustrated work piece 24 being shown at the start of the bonding method.

When the torch traverses the base metal, the base metal is indexed radially at the end of each stroke to a width of the weld bead being applied. Each operation stroke is shown by lines 26, 28, and 30, executed prior to pass 32 being illustrated in FIG. 3.

Figure 4:
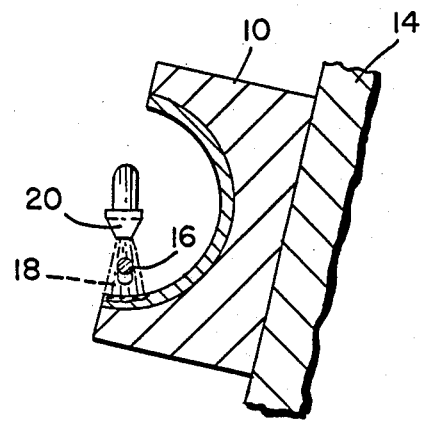
FIG. 4 is a transverse sectional view similar to that of FIG. 3, illustrating the present method except at the end of the operation with workpiece indexing.

FIG. 4, presents a similar view to that of FIG. 3, except at the end of the operation with the workpiece being indexed for a next puddle stroke.

It is found that practice of the present invention provides a true weld bond with minimal base metal dilution.

It is also found that because the filler metal is not pre-heated, separation of antimony, commonly experienced in prior art methods, does not occur thereby maintaining the integrity of the babbitt alloy.

Because there is no pre-heating of the base metal, it is also found that following bonding, the base metal experiences minimal distortion, at best.

Deposit thickness of the filler metal can also be readily controlled by the present method thereby eliminating excess waste of expensive bearing filler metal.

With the aforedescribed arrangement and method, very large bearings can be lined or relined with a minimum of apparatus. Although the invention is not limited to a particular size or range of bearing sizes, it will be seen that it is particularly adapted for the production of very large bearing surfaces. In any case, it is not necessary to handle extremely large quantities of molten metal at one time, and thus the hazards attendant therewith are avoided. Moreover, the particular arrangement of the present invention assures the toughest possible bearing material together with the requisite adhesion thereof to the base metal, in addition to the necessary cohesiveness within the bearing metal itself.

It will be readily apparent that the method described herein is adaptable not only for the production of new bearings but for relining or rebabbitting used shells that have been in service and, owing to age, distortion, movement of bearing metal or faulty metal or the like, require replacement of the bearing lining.

From the foregoing, it will be apparent that novel and efficient forms of bearings, together with methods and apparatus for producing the same have been described herein. While preferred embodiments of the invention have been shown and described and have been illustrated presently preferred methods of practicing the same, it is to be distinctly understood that the invention is not limited thereto, but may be otherwise variously embodied and practiced within the scope of the following claims.

What is claimed is:

1. A method for metal bonding a filler metal onto a base metal bearing which method comprises the steps, (1) passing an air-cooled gas-tungsten-arc torch in contact with the base metal bearing in only a relatively longitudinal direction, (2) creating a weld puddle by means of the air-cooled gas-tungsten-arc torch, (3) feeding a solid length of filler metal into the air-cooled gas-tungsten-arc torch from a relative transverse direction thereto, (4) indexing radially the longitudinal direction of travel of the air-cooled gas-tungsten-arc torch to the width of a weld bead, and continuing steps (1) to (4) sequentially until the base metal bearing is bonded with filler material.

2. The method of claim 1, wherein the filler metal is introduced as a wire.

3. The method of claim 1, wherein the base metal bearing is bronze metal, and the filler metal is an alloy containing by weight 85% copper, 6.5% tin, 6% lead and 3% zinc.

4. The method of claim 1, wherein the base metal bearing is a 85-5-5 ratio by weight of copper-antimony-tin.

* * * * *